United States Patent
Mahasseni et al.

(10) Patent No.: US 12,518,457 B1
(45) Date of Patent: Jan. 6, 2026

(54) AGENT-AGNOSTIC MOTION PLANNER

(71) Applicant: Apple Inc., Cupertino, CA (US)

(72) Inventors: Behrooz Mahasseni, Los Altos, CA (US); Bo Morgan, Santa Cruz, CA (US); Mark E. Drummond, East Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 177 days.

(21) Appl. No.: 18/369,792

(22) Filed: Sep. 18, 2023

Related U.S. Application Data

(60) Provisional application No. 63/409,256, filed on Sep. 23, 2022.

(51) Int. Cl.
| | | |
|---|---|---|
| *B25J 9/16* | (2006.01) | |
| *G06N 5/01* | (2023.01) | |
| *G06T 13/40* | (2011.01) | |

(52) U.S. Cl.
CPC ............. *G06T 13/40* (2013.01); *B25J 9/1633* (2013.01); *B25J 9/1664* (2013.01); *G06N 5/01* (2023.01)

(58) Field of Classification Search
None
See application file for complete search history.

(56) References Cited

U.S. PATENT DOCUMENTS

| | | | |
|---|---|---|---|
| 8,556,718 B2 | 10/2013 | Hashimoto | |
| 9,381,426 B1 | 7/2016 | Hughes et al. | |
| 10,551,993 B1 | 2/2020 | Sanocki et al. | |
| 12,097,427 B1* | 9/2024 | Schaefer | A63F 13/56 |
| 2012/0215354 A1* | 8/2012 | Krasny | B25J 9/1666 |
| | | | 901/1 |
| 2019/0011921 A1* | 1/2019 | Wang | G06V 20/10 |
| 2019/0389062 A1* | 12/2019 | Truebenbach | G05B 19/4155 |
| 2021/0001481 A1* | 1/2021 | Hayashi | B25J 9/163 |
| 2021/0031365 A1* | 2/2021 | Demirdjian | B25J 9/163 |
| 2021/0183255 A1* | 6/2021 | Van Tulder | G08G 5/22 |
| 2021/0260755 A1* | 8/2021 | Kuratani | B25J 9/1664 |
| 2021/0325891 A1* | 10/2021 | Young | G05D 1/0221 |
| 2021/0404826 A1* | 12/2021 | Yu | A63F 13/422 |
| 2022/0197306 A1* | 6/2022 | Cella | G05B 19/41865 |
| 2023/0280164 A1* | 9/2023 | Kikkawa | G05D 1/0214 |
| | | | 701/26 |

* cited by examiner

*Primary Examiner* — Joni Hsu

(74) *Attorney, Agent, or Firm* — Fernando & Partners, LLP

(57) ABSTRACT

A method includes obtaining, at a motion planner, a request to provide a motion plan for an agent that is associated with a motion controller that controls movement of a representation of the agent in an environment. The method includes determining, by the motion planner, an input characteristic of the motion controller that controls movement of the representation of the agent. The method includes generating, by the motion planner, the motion plan for the agent based on the input characteristic of the motion controller. The method includes triggering the motion controller to manipulate the representation of the agent within the environment in accordance with the motion plan generated by the motion planner.

20 Claims, 4 Drawing Sheets

AGENT-AGNOSTIC MOTION PLANNER

CROSS-REFERENCE TO RELATED APPLICATION

This application claims the benefit of U.S. Provisional Patent App. No. 63/409,256, filed on Sep. 23, 2022, which is incorporated by reference in its entirety.

TECHNICAL FIELD

The present disclosure generally relates to an agent-agnostic motion planner.

BACKGROUND

Some devices include a display that presents visual content. Some devices implement a virtual agent. Such devices can display a representation of the virtual agent as visual content. Configuring the virtual agent to manipulate the representation of the virtual agent is resource-intensive.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
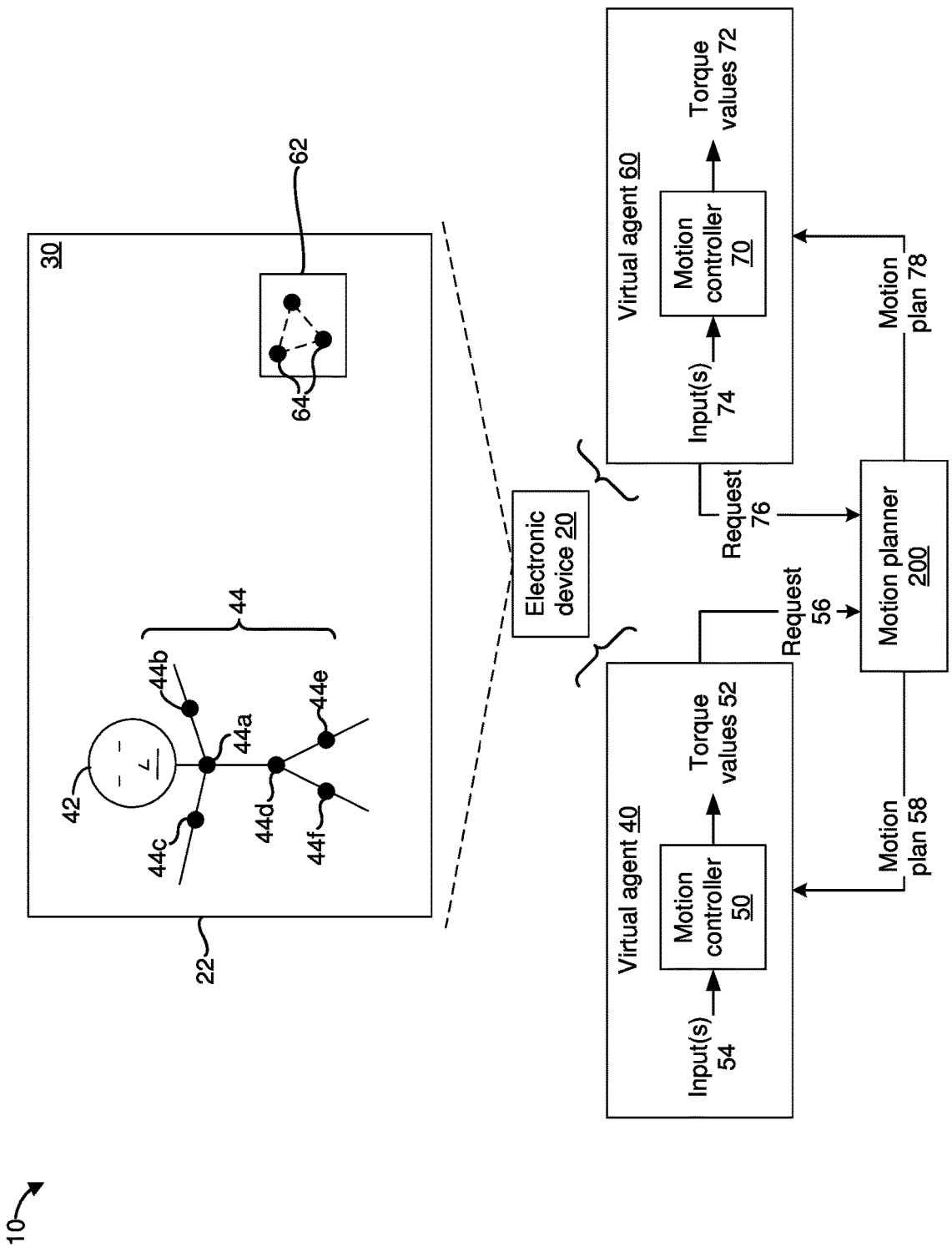
FIG. 1 is a diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for providing agent-agnostic motion planning. In some implementations, the method is performed by a device including a non-transitory memory and one or more processors. In some implementations, the method includes obtaining, at a motion planner, a request to provide a motion plan for an agent that is associated with a motion controller that controls movement of a representation of the agent in an environment. In some implementations, the method includes determining, by the motion planner, an input characteristic of the motion controller that controls movement of the representation of the agent. In some implementations, the method includes generating, by the motion planner, the motion plan for the agent based on the input characteristic of the motion controller. In some implementations, the method includes triggering the motion controller to manipulate the representation of the agent within the environment in accordance with the motion plan generated by the motion planner.

In accordance with some implementations, a device includes one or more processors, a plurality of sensors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Some devices implement an agent that includes a motion planner and a motion controller. The motion planner generates a motion plan for a representation of the agent and the motion controller manipulates the representation of the agent in accordance with the motion plan. Since the motion planner is integrated into the agent, the motion planner is specifically configured to generate motion plans for the agent and not for other agents. For example, if the agent represents a virtual character, a content creator that created the virtual character integrates a character-specific motion planner into the agent. Creating agent-specific motion planners is a resource-intensive operation. A motion planner created for a particular agent cannot be used for another agent because the two agents may have different motion controllers. For example, a motion planner created for a virtual character cannot be used to generate a motion plan for a virtual dog because the virtual character and the virtual dog may be controlled by different motion controllers.

The present disclosure provides methods, systems, and/or devices for generating motion plans for various agents that are associated with different motion controllers. The motion planner generates a motion plan for an agent based on an input characteristic of a motion controller that controls movement of a representation of the agent. The input characteristic of the motion controller can indicate a type of the motion controller. For example, the input characteristic may indicate whether the representation of the agent is controlled by a joystick controller, a keyboard, a keypad, a gaze of a person, voice commands, etc. The input characteristic of the motion controller may indicate a number of inputs that the motion controller accepts. For example, the input characteristic may indicate whether the motion controller is controlled by a set of two keys (e.g., a first key that controls forward movement and a second key that controls backward movement) or by a set of four keys (e.g., a first key that controls forward movement, a second key that controls backward movement, a third key that controls leftward movement and a fourth key that controls rightward movement). The input characteristic of the motion controller may indicate functions of each of the inputs that the motion controller accepts. For example, the input characteristic of the motion controller may indicate which of the four keys results in a forward movement, which of the four keys result in a backward movement, etc. As another example, the input characteristic of the motion controller may indicate that the motion controller is a discrete motion controller with up, down, left and right directional controls for triggering movements in the up, down, left and right directions, respectively. The motion controller may be a callable motion controller that can be invoked without human intervention. For example, the motion controller may receive the motion plan via an application programming interface (API), generate a sequence of motions in accordance with the motion plan and manipulate the representation of the agent to exhibit the sequence of motions without requiring an input from a human operator.

FIG. 1 is a diagram that illustrates an example physical environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the physical environment 10 includes an electronic device 20 and a user (not shown) of the electronic device 20.

In some implementations, the electronic device 20 includes a handheld computing device that can be held by the user. For example, in some implementations, the electronic device 20 includes a smartphone, a tablet, a media player, a laptop, or the like. In some implementations, the electronic device 20 includes a wearable computing device that can be worn by the user. For example, in some implementations, the electronic device 20 includes a head-mountable device (HMD) or an electronic watch. In various implementations, the electronic device 20 includes a display 22. In the example of FIG. 1, the display 22 presents an XR environment 30.

In various implementations, the electronic device 20 implements an agent. In the example of FIG. 1, the electronic device 20 includes a first virtual agent 40 and a second virtual agent 60. In some implementations, the electronic device 20 includes a first set of executable instructions that implement the first virtual agent 40 and a second set of executable instructions that implement the second virtual agent 60. In the example of FIG. 1, the XR environment 30 includes a first XR representation 42 of the first virtual agent 40 and a second XR representation 62 of the second virtual agent 60. In the example of FIG. 1, the first XR representation 42 has a visual appearance that resembles an appearance of a person, for example, because the first virtual agent 40 represents a character (e.g., a fictional character from a book, a TV show or a movie). As such, the first XR representation 42 may be referred to as a virtual character. In the example of FIG. 1, the second XR representation 62 has a visual appearance that resembles an appearance of a dog, for example, because the second virtual agent 60 represents a dog. As such, the second XR representation 62 may be referred to a virtual dog.

In various implementations, an agent models the behavior of an entity and a representation of the agent has a visual appearance that is within a similarity threshold of a visual appearance of the entity. In some implementations, the agent models the behavior of a real-world entity (e.g., a physical entity such as a machine or a dog). In some implementations, the agent models the behavior of a fictional entity (e.g., a character described in a fictional work such as a novel, a movie or a TV show). In the example of FIG. 1, the first virtual agent 40 models the behavior of a character and the first XR representation 42 has a visual appearance that is within a similarity threshold of (e.g., resembles) a visual appearance of the character that the first virtual agent 40 models. Similarly, the second virtual agent 60 models the behavior of a dog and the second XR representation 62 has a visual appearance that is within a similarity threshold of (e.g., resembles) a visual appearance of the dog that the second virtual agent 60 models.

In some implementations, a representation of an agent includes a physical entity. For example, the first XR representation 42 may be a physical robot that resembles a human being. Similarly, the second XR representation 62 may be a physical robot that resembles a dog. In some implementations, the representation of the agent includes a virtual entity. For example, the first XR representation 42 may be a virtual person that appears similar to a human being and the second XR representation 62 may be a virtual dog that appears similar to a real dog.

In various implementations, the representation of an agent includes joints that can be manipulated in order to provide an appearance that the representation of the agent is moving to perform an action. In the example of FIG. 1, the first XR representation 42 includes a first set of virtual joints 44 that can be manipulated (e.g., rotated and/or translated) in order to provide an appearance that the first XR representation 42 is performing an action in the XR environment 30. The first set of virtual joints 44 may include a virtual neck joint 44a, a virtual left elbow joint 44b, a virtual right elbow joint 44c, a virtual hip joint 44d, a virtual left knee joint 44e and a virtual right knee joint 44f. Similarly, the second XR representation 62 includes a second set of virtual joints 64 that can be manipulated in order to provide an appearance that the second XR representation 62 is performing an action in the XR environment 30.

In various implementations, an agent is associated with (e.g., includes) a motion controller that generates torque values for the joints of the representation of the agent. When a torque value is applied to a corresponding joint, portions of the agent that are connected to the joint move thereby exhibiting a motion of the representation of the agent. In the example of FIG. 1, the first virtual agent 40 includes a first motion controller 50 that generates a first set of torque values 52 for the first set of virtual joints 44 based on a first set of inputs 54. Similarly, the second virtual agent 60 includes a second motion controller 70 that generates a second set of torque values 72 for the second set of virtual joints 64 based on the second set of inputs 74.

In various implementations, an agent sends a request for a motion plan to a motion planner 200. The motion planner 200 determines an input characteristic of inputs that the motion controller of the agent accepts. The input characteristic may indicate types of motions that the representation of the agent can perform. The motion planner 200 generates a motion plan for the agent based on the input characteristic of the inputs that the motion controller accepts. The motion planner 200 provides the motion plan to the agent. After receiving the motion plan from the motion planner 200, the motion controller of the agent generates torque values for joints of a representation of the agent. Generating the motion plan based on the input characteristic of the inputs that the motion controller accepts allows the motion planner 200 to include motions in the motion plan that the representation of the agent is capable of performing and exclude motions from the motion plan that the representation of the agent is not capable of performing.

In the example of FIG. 1, the first virtual agent 40 sends a first request 56 to the motion planner 200. The motion planner 200 determines an input characteristic of the first set of inputs 54 that the first motion controller 50 accepts. The input characteristic of the first set of inputs 54 may indicate a number of the first set of inputs 54, functions of the first set of inputs 54 and/or an input modality for receiving the first set of inputs 54 (e.g., a keypad, a keyboard, a mouse, a touchpad, a touchscreen, gaze and/or voice). The motion planner 200 generates a first motion plan 58 based on the input characteristic of the first set of inputs 54. The input characteristic of the first set of inputs 54 may indicate types of motions that the first XR representation 42 can perform. Based on the input characteristic of the first set of inputs 54, the motion planner 200 can generate the first motion plan 58 to include at least a subset of the types of motions that the first XR representation 42 can perform and exclude types of motions that the first XR representation 42 cannot perform.

Similarly, the second virtual agent 60 sends a second request 76 to the motion planner 200. The motion planner 200 determines an input characteristic of the second set of inputs 74 that the second motion controller 70 accepts. The input characteristic of the second set of inputs 74 may indicate a number of the second set of inputs 74, functions of the second set of inputs 74 and/or an input modality for receiving the second set of inputs 74 (e.g., a keypad, a keyboard, a mouse, a touchpad, a touchscreen, gaze and/or voice). The motion planner 200 generates a second motion plan 78 based on the input characteristic of the second set of inputs 74. The input characteristic of the second set of inputs 74 may indicate types of motions that the second XR representation 62 can perform. Based on the input characteristic of the second set of inputs 74, the motion planner 200 can generate the second motion plan 78 to include at least a subset of the types of motions that the second XR representation 62 can perform and exclude types of motions that the second XR representation 62 cannot perform.

As can be seen in FIG. 1, the first virtual agent 40 and the second virtual agent 60 do not include individual dedicated motion planners. Instead, the first virtual agent 40 and the second virtual agent 60 utilize the same motion planner 200. Since the first virtual agent 40 and the second virtual agent 60 utilize the same motion planner 200, entities (e.g., content creators such as application developers) that created the first virtual agent 40 and the second virtual agent 60 do not have to create individual dedicated motion planners. Not having to create individual dedicated motion planners for the first virtual agent 40 and the second virtual agent 60 conserves resources associated with creating agent-specific motion planners. For example, an application developer that is developing an application with a virtual character need not spend time in building a motion planner for the virtual character, training the motion planner and testing the motion planner because the motion planner 200 can generate motion plans for the virtual character. In this example, the application developer may be able to develop the application in a shorter amount of time, for example, because the application developer does not have to create and train a dedicated motion planner for the virtual character. In various implementations, having the motion planner 200 operate as the motion planner for various agents conserves memory that would otherwise have been required to store individual dedicated motion planners for each agent. In some implementations, the electronic device 20 is an HMD with a limited amount of memory and conserving memory by having a single motion planner 200 for multiple agents instead of having dedicated motion planners for various agents allows the HMD to operate with fewer operational abnormalities (e.g., with fewer memory overrun errors).

In some implementations, the motion planner 200 resides at the electronic device 20. Alternatively, in some implementations, the motion planner 200 resides at another device. For example, in some implementations, the electronic device 20 is an HMD and the motion planner 200 resides at a smartphone, a tablet, a laptop computer and/or a desktop computer that is in wireless electronic communication with the HMD. In some implementations, the motion planner 200 resides at a server. For example, the motion planner 200 can reside at a cloud computing platform that includes various computing resources and storage resources.

Figure 2:
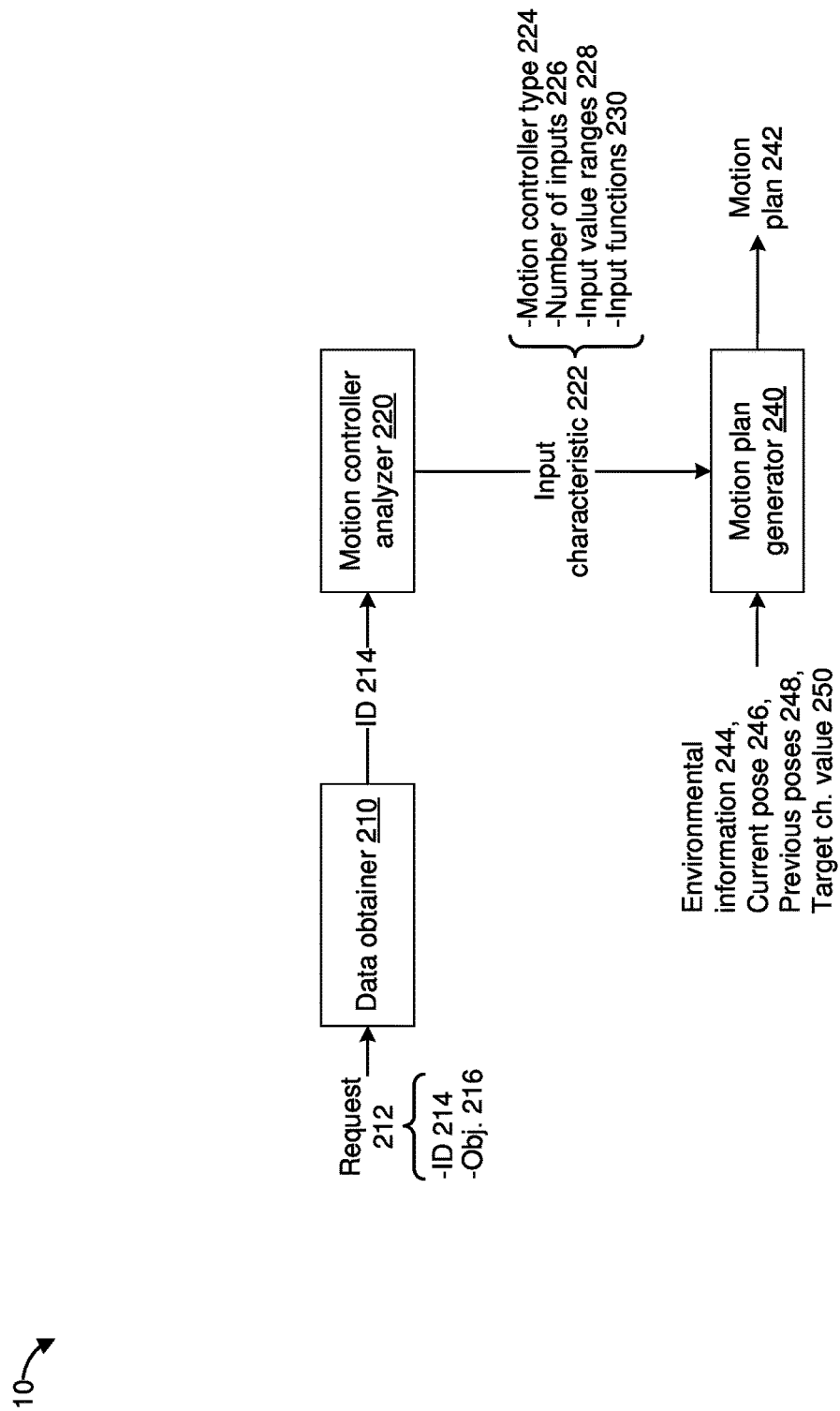
FIG. 2 is a diagram of an agent-agnostic motion planner in accordance with some implementations.

FIG. 2 is a block diagram of the motion planner 200 in accordance with some implementations. In various implementations, the motion planner 200 includes a data obtainer 210, a motion controller analyzer 220 and a motion plan generator 240. In various implementations, the data obtainer 210 obtains a request 212 for a motion plan. For example, the data obtainer 210 receives the first request 56 and/or the second request 76 shown in FIG. 1. In some implementations, the request 212 includes an identifier (ID) 214 that identifies an agent that generated the request 212 and/or a motion controller that is associated with the agent. For example, the first request 56 (shown in FIG. 1) may include an ID of the first virtual agent 40 and/or the first motion controller 50. Similarly, the second request 76 (shown in FIG. 1) may include an ID of the second virtual agent 60 and/or the second motion controller 70. In some implementations, the request 212 indicates an objective of the agent (e.g., a goal of the agent, a task that the agent has been assigned, or a set of actions for the representation of the agent to perform).

In some implementations, the motion controller analyzer 220 determines an input characteristic 222 of a motion controller of an agent associated with the request 212. In some implementations, the motion controller analyzer 220 receives the ID 214 from the data obtainer 210. The motion controller analyzer 220 can utilize the ID 214 to retrieve information regarding the agent and/or the motion controller of the agent. In some implementations, the motion controller analyzer 220 utilizes the ID 214 to query a datastore that stores information regarding the agent and/or the motion controller of the agent. In some implementations, the motion controller analyzer 220 utilizes the ID 214 to request the input characteristic 222 from an entity (e.g., an application developer and/or an equipment manufacturer) that created the agent.

In various implementations, the motion controller analyzer 220 determines the input characteristic 222 by analyzing the inputs that the motion controller accepts. In some implementations, the input characteristic 222 indicates a motion controller type 224 of the motion controller. For example, the input characteristic 222 may indicate whether the motion controller accepts inputs from a keypad, a keyboard, a joystick controller, a touchpad, a touchscreen, a mouse, eye gaze and/or voice commands. In some implementations, the input characteristic 222 indicates a number of inputs 226 that the motion controller accepts. For example, the input characteristic 222 may indicate whether the motion controller accepts a single input, two inputs, four inputs, etc. The number of inputs 226 may indicate a degree of freedom that the representation of the agent has. The degree of freedom of the representation of the agent may affect a number of movements that are in a motion plan 242 that the motion planner 200 generates. For example, the number of movements may be inversely proportional to the degree of freedom of the representation of the agent. As an example, the greater the degree of freedom, the fewer movements the representation of the agent may have to perform in order to satisfy its objective.

In some implementations, the input characteristic 222 indicates input value ranges 228 of the inputs that the motion controller accepts. The input value ranges 228 may indicate types of inputs that the motion controller accepts. For example, the input value ranges 228 may indicate whether the motion controller accepts whole numbers, decimal numbers, Boolean values and alphanumeric characters as values for the inputs. The input value ranges 228 may affect a granularity of the motion plan 242. For example, input value ranges 228 that include decimal numbers may result in a more granular motion plan 242. By contrast, input value ranges 228 that include Boolean values may result in a relatively coarse motion plan 242.

In some implementations, the input characteristic 222 indicates input functions 230 of the inputs that the motion controller accepts. For example, if the motion controller accepts two inputs, the input functions 230 may indicate which of the two inputs results in forward movement and which of the two inputs results in backward movement. The input functions 230 affect the motions that are incorporated in the motion plan 242. For example, the motion plan 242 can be limited to include motions that can be performed based on the input functions 230 and the motion plan 242 can exclude motions that cannot be performed based on the input functions 230. As an example, if the input functions 230 include forward movement and backward movement but not rightward and leftward movement, the motion plan 242 may include forward and backward movements but not rightward or leftward movements. As another example, the input characteristic 222 may indicate that the motion controller is a discrete motion controller with up, down, left and right directional controls for triggering movements in the up, down, left and right directions, respectively.

In some implementations, the motion controller analyzer 220 analyzes the motion controller by generating values for the inputs of the motion controller, providing the values to the inputs and monitoring a resultant output of the motion controller. Monitoring the resultant output of the motion controller allows the motion controller analyzer 220 to determine how the motion controller responds to different input values.

In some implementations, the motion controller analyzer 220 determines the input characteristic 222 of the motion controller by analyzing a representation of the agent. In some implementations, the motion controller analyzer 220 performs semantic segmentation on an image of the representation in order to identify different components of the representation. Based on the components, the motion controller analyzer 220 determines the types of motions that the representation can likely perform. Based on the types of motions that the representation can likely perform, the motion controller analyzer 220 identifies potential inputs and outputs of the motion controller. In such implementations, the input characteristic 222 characterizes the potential inputs of the motion controller.

In various implementations, the motion plan generator 240 obtains the input characteristic 222 from the motion controller analyzer 220. The motion plan generator 240 generates the motion plan 242 based on the input characteristic 222. In some implementations, the motion plan generator 240 generates a rapidly-exploring random tree (RRT) that represents the environment. The motion plan generator 240 utilizes the RRT to identify a potential path for the representation of the agent to traverse. The motion plan generator 240 generates the motion plan 242 in order to allow the representation of the agent to traverse the potential path.

In some implementations, the motion plan generator 240 utilizes a machine-learned model of a root motion to verify the motion plan. In some implementations, root motion refers to a single movement that can be combined with multiple instances of itself or with other movements to form a series of movements. Examples of root motion include rotational movement (e.g., rotating a joint), linear movement (e.g., translating a joint), etc. In some implementations, the motion plan generator 240 modifies the motion plan 242 to generate a new motion plan for the agent in response to an unsuccessful verification of the motion plan 242. For example, the motion plan generator 240 can modify the motion plan 242 based on an error generated during the verification of the motion plan 242. In some implementations, the machine-learned model includes a causal model (e.g., an abstract causal model) that represents a subset of a plurality of joints of the representation of the agent. Representing a subset of the joints instead of representing all the joints of the representation of the agent results in a relatively smaller causal model thereby conserving computing resources required to store and execute the causal model. In some implementations, the request 212 includes the causal model or a reference thereto.

In some implementations, the motion plan generator 240 generates the motion plan 242 based on environmental information 244 regarding the environment of the representation of the agent. The environmental information 244 may indicate weather conditions of the environment (e.g., temperature, air pressure, humidity level, etc.). In some implementations, the environmental information 244 indicates locations of objects in the environment. The motion plan 242 can include motions that are feasible based on the objects and the layout of the environment, and exclude motions that are not feasible based on the objects and the layout of the environment. In some implementations, the motion plan generator 240 generates the motion plan 242 based on a current pose 246 and/or based on previous poses 248 of the representation of the agent. The current pose 246 and/or the previous poses 248 may indicate a movement range of the representation of the agent, and the motion plan 242 can include motions that are within the movement range while avoiding motions that are outside the movement range of the representation of the agent.

In some implementations, the motion plan generator 240 generates the motion plan 242 based on a target characteristic value 250. The target characteristic value 250 can indicate a target behavior for the agent. For example, the target characteristic value 250 can indicate a behavioral trait for the representation of the agent to exhibit while the representation is being manipulated in the environment. As an example, the target characteristic value 250 may indicate whether the representation of the agent is to go about performing actions in the environment in a friendly manner or an angry manner. In some implementations, the target characteristic value 250 allows the motion plan 242 to be customized in accordance with characteristics of the agent (e.g., behavioral traits associated with the agent). In some implementations, the request 212 includes the environmental information 244, the current pose 246 and/or the previous poses 248. Alternatively, in some implementations, the motion planner 200 (e.g., the motion plan generator 240) determines the environmental information 244, the current pose 246 and/or the previous poses 248 by monitoring the environment. In some implementations, the request 212 includes the target characteristic value 250. Alternatively, in some implementations, the motion planner 200 (e.g., the motion plan generator 240) determines the target characteristic value 250 based on stored information regarding the agent (e.g., based on metadata associated with the agent that describes behavioral traits of the agent, for example, whether the agent is friendly, unfriendly, pleasant, angry, etc.).

In some implementations, the motion planner 200 (e.g., the motion plan generator 240) provides the motion plan 242 to the agent (e.g., to the motion controller of the agent). Providing the motion plan 242 to the agent, triggers the motion controller to manipulate the representation of the agent within the environment in accordance with the motion plan 242 generated by the motion planner 200. In some implementations, the motion planner 200 transmits the motion plan 242 to a second device that implements the motion controller in order to allow the motion controller to generate torque values (e.g., the first set of torque values 52 and/or the second set of torque values 72 shown in FIG. 1) for joints of the representation of the agent and move the joints based on the torque values. In some implementations, the motion controller is a callable motion controller (e.g., via an API). In such implementations, the motion planner 200 (e.g., the motion plan generator 240) provides the motion plan 242 to the motion controller via an API. In some implementations, the motion planner 200 allows the motion controller to obtain (e.g., access or retrieve) the motion plan 242 by making an API call.

In some implementations, the motion planner 200 generates another motion plan for another agent. For example, in some implementations, the data obtainer 210 obtains a second request for a second motion plan for a second agent that is associated with a second motion controller. The motion controller analyzer 220 identifies an input characteristic of the second motion controller. The motion plan generator 240 generates the second motion plan based on the input characteristic of the second motion controller. As an example, referring to FIG. 1, the motion planner 200 generates the first motion plan 58 for the first virtual agent 40 and the second motion plan 78 for the second virtual agent 60. In some implementations, the motion planner 200 generates different motion plans for corresponding agents concurrently.

Figure 3:
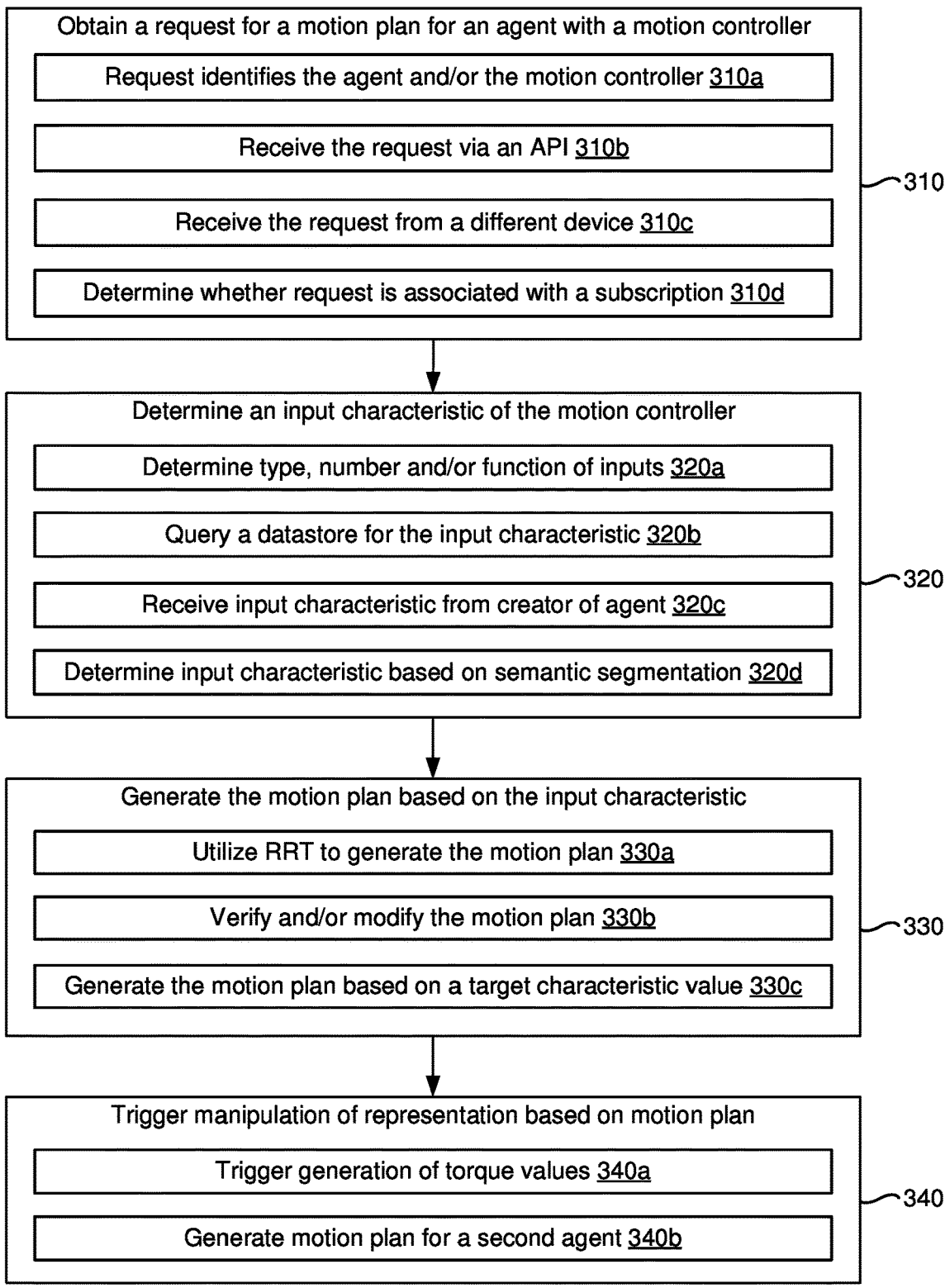
FIG. 3 is a flowchart representation of a method of providing a motion plan for an agent in accordance with some implementations.

FIG. 3 is a flowchart representation of a method 300 for providing a motion plan for an agent. In various implementations, the method 300 is performed by the motion planner 200 shown in FIGS. 1 and 2. In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes obtaining, at a motion planner, a request to provide a motion plan for an agent that is associated with a motion controller that controls movement of a representation of the agent in an environment. For example, as shown in FIG. 1, the motion planner 200 receives the first request 56 to provide the first motion plan 58 for the first virtual agent 40.

As represented by block 310a, in some implementations, the request includes an identifier (ID) that identifies the agent and/or the motion controller. For example, as shown in FIG. 2, the request 212 includes the ID 214 that identifies the agent that made the request 212 and/or the motion controller integrated into the agent. As represented by block 310b, in some implementations, obtaining the request includes receiving the request via an application programming interface (API). For example, referring to FIG. 1, in some implementations, an application that is installed on the electronic device 20 utilizes an API to request the motion plan from the motion planner 200.

As represented by block 310c, in some implementations, the device includes a server or a cloud computing platform that receives the request from a client device that implements the agent and displays the environment with the representation of the agent. For example, referring to FIG. 1, in some implementations, the electronic device 20 is a client device such as an HMD, a smartphone, a laptop or a desktop, and the motion planner 200 resides at a server or at a cloud computing platform.

As represented by block 310d, in some implementations, the method 300 includes determining whether the request is associated with a subscription to a motion planning service. In some implementations, the method 300 includes generating the motion plan in response to determining that the request is associated with a subscription to the motion planning service. In some implementations, the method 300 includes forgoing generation of the motion plan in response to determining that the request is not associated with a subscription to the motion planning service. In some implementations, the method 300 includes providing an option to subscribe to the motion planning service in response to the request not being associated with a subscription to the motion planning service.

In some implementations, the representation of the agent includes a rig with a set of one or more joints. A motion controller can manipulate the rig by generating torque values for the set of joints of the rig. When the torque values are applied to the joints, portions of the rig move.

As represented by block 320, in various implementations, the method 300 includes determining, by the motion planner, an input characteristic of the motion controller that controls movement of the representation of the virtual agent. For example, as shown in FIG. 2, the motion controller analyzer 220 determines the input characteristic 222 of the motion controller integrated into the agent that generated the request 212.

As represented by block 320a, in some implementations, determining the input characteristic of the motion controller includes determining a type of input that the motion controller accepts. For example, in some implementations, the method 300 includes determining whether the motion controller accepts keystrokes from a keyboard, joystick movement values from a joystick controller, mouse click events from a mouse, a gaze vector from a gaze tracker, voice commands from a microphone, 2D or 3D gesture inputs from a gesture tracking device such as a camera or a touchscreen, etc. As shown in FIG. 2, the motion controller analyzer 220 determines the motion controller type 224.

In some implementations, determining the input characteristic of the motion controller includes determining a number of inputs that the motion controller accepts. As shown in FIG. 2, the motion controller analyzer 220 determines the number of inputs 226 that the motion controller accepts. In some implementations, the number of inputs indicates types of movements the motion controller supports. For example, if the motion controller for a humanoid character accepts four inputs, the motion controller likely supports forward movement, backward movement, leftward movement and rightward movement. As another example, if the motion controller for the humanoid character accepts five inputs, the motion controller likely supports forward movement, backward movement, leftward movement and rightward movement and jumps.

In some implementations, determining the input characteristic of the motion controller includes determining a function of an input that the motion controller accepts. For example, as shown in FIG. 2, the motion controller analyzer 220 determines the input functions 230. In some implementations, the method 300 includes determining a relation between the input and the movement of the representation of the agent in the environment. As an example, the method 300 includes changing a value of a particular input and monitoring the representation of the agent in order to determine how the change in the value affects the motion of the representation in the environment. For example, determining whether changing a value of a particular input results in a change in a speed of the representation of the agent.

As represented by block 320b, in some implementations, determining the input characteristic includes querying a datastore that stores information regarding the agent or the motion controller. In some implementations, the agent is implemented by an application, and the method 300 includes querying metadata associated with the application. As represented by block 320c, in some implementations, determining the input characteristic includes receiving the input characteristic from an entity that created the virtual agent. In some implementations, the agent was created by an application developer and the method 300 includes scraping a web page where the application developer describes the inputs that the motion controller accepts.

As represented by block 320d, in some implementations, determining the input characteristic includes performing semantic segmentation on image data that corresponds to the representation of the agent to generate a set of semantic values that identify respective visual components of the representation of the agent. For example, referring to FIG. 1, the motion planner 200 can perform semantic segmentation on the first XR representation 42 to generate semantic values that identify respective components of the first XR representation 42. For example, a first semantic value may identify a face of the first XR representation 42, a second semantic value may identify a left arm of the first XR representation 42, a third semantic value may identify a right arm of the first XR representation 42, a fourth semantic value may identify a left leg of the first XR representation 42, a fifth semantic value may identify a right leg of the first XR representation 42, etc. In some implementations, the method 300 includes determining types of motions that the representation of the agent can perform based on the visual components. For example, based on the second semantic value and the third semantic value indicating the presence of two arms, the motion planner 200 may determine that the first XR representation 42 can lift objects. As another example, based on the fourth semantic value and the fifth semantic value indicating the presence of two legs, the motion planner 200 may determine that the first XR representation 42 can walk or run. In some implementations, the method 300 includes determining potential inputs that the motion controller accepts in order to effectuate the types of motions that the representation of the virtual agent can perform. For example, referring to FIG. 1, based on the ability of the first XR representation 42 to lift objects, the motion planner 200 may determine that the first set of inputs 54 may include a lift up input and a put down input. Similarly, based on the ability of the first XR representation 42 to walk or run, the motion planner 200 may determine that the first set of inputs 54 may include a forward movement input, a backward movement input, a rightward movement input and a leftward movement input.

As represented by block 330, in various implementations, the method 300 includes generating, by the motion planner, the motion plan for the virtual agent based on the input characteristic of the motion controller. For example, as shown in FIG. 2, the motion plan generator 240 generates the motion plan 242 based on the input characteristic 222. Generating the motion plan based on the input characteristic allows the motion planner 200 to generate motion plans for different agents with dedicated motion controllers thereby making the motion planner 200 an agent-agnostic motion planner.

As represented by block 330a, in some implementations, generating the motion plan includes generating a rapidly-exploring random tree (RRT) that represents the environment, utilizing the RRT to identify a potential path for the representation of the agent to traverse, and generating the motion plan in order to allow the representation of the agent to traverse the potential path. For example, as described in relation to FIG. 2, the motion plan generator 240 can utilize an RRT to generate the motion plan 242.

As represented by block 330b, in some implementations, the method 300 includes utilizing a machine-learned model of a root motion to verify the motion plan. In some implementations, the method 300 includes modifying the motion plan in order to generate a new motion plan for the agent in response to an unsuccessful verification of the motion plan. For example, in some implementations, the method 300 includes generating the new motion plan by modifying the motion plan based on an error generated during the verification of the motion plan. In some implementations, the machine-learned model that is used to verify the motion plan includes a causal model (e.g., an abstract causal model) that represents a subset of a plurality of joints of the representation of the agent, for example, instead of representing all the joints of the representation of the agent thereby conserving computing resources. In some implementations, the request to generate the motion plan includes the causal model or a reference to the causal model.

As represented by block 330c, in some implementations, the method 300 includes generating the motion plan based on a target characteristic value specified by the request. For example, as shown in FIG. 2, the motion plan generator 240 generates the motion plan 242 based on the target characteristic value 250. In some implementations, the request specifies a target behavior for the agent and the motion plan includes motions that exhibit the target behavior. For example, if the target behavior is to appear friendly, then the motion plan includes a walking motion that appears friendly, for example, instead of a walking motion that appears aggressive.

As represented by block 340, in various implementations, the method 300 includes triggering the motion controller to manipulate the representation of the agent within the environment in accordance with the motion plan generated by the motion planner. For example, referring to FIG. 1, the motion planner 200 triggers the first motion controller 50 to generate the first set of torque values 52 in accordance with the first motion plan 58.

As represented by block 340a, in some implementations, triggering the motion controller to manipulate the representation of the virtual agent includes transmitting the motion plan to a second device that implements the motion controller. In some implementations, the motion controller generates torque values for joints of the representation of the virtual agent and moves the joints based on the torque values. For example, referring to FIG. 1, the motion planner 200 transmits the first motion plan 58 to the electronic device 20, and the first motion controller 50 generates the first set of torque values 52 based on the first motion plan 58.

As represented by block 340b, in some implementations, the method 300 includes obtaining, at the motion planner, a second request for a second motion plan for a second agent that is associated with a second motion controller. The second agent is different from the agent and the second motion controller is different from the motion controller. For example, as shown in FIG. 1, the motion planner 200 obtains the first request 56 from the first virtual agent 40 and the second request 76 from the second virtual agent 60. In some implementations, the method 300 includes identifying, by the motion planner, a second input characteristic of the second motion controller. The second input characteristic is different from the input characteristic of the motion controller. For example, as described in relation to FIG. 2, the motion planner 200 determines an input characteristic that characterizes the second set of inputs 74 of the second motion controller 70. In some implementations, the method 300 includes generating, by the motion planner, the second motion plan based on the second input characteristic of the second motion controller. For example, as shown in FIG. 1, the motion planner 200 generates the second motion plan 78 based on the input characteristic that characterizes the second set of inputs 74 of the second motion controller 70.

In some implementations, the method 300 includes selecting the motion planner from a plurality of motion planners associated with respective motion planner types. In some implementations, the motion planner is selected based on a type of motion planner specified by the request. An example of a type of motion planner is a combinatorial motion planner that partitions the environment into smaller partitions, generates respective motion plans for the smaller partitions and combines the respective motion plans for the smaller partitions to generate a resultant motion plan for the environment. Another example of a type of motion planner is a sampling-based motion planner that utilizes collision detection to determine whether a particular motion plan results in collisions within the environment. A sampling-based motion planner can utilize a graph structure to represent a portion of the environment that the sampling-based motion planner has explored (e.g., mapped). Examples of sampling-based motion planners include a discrete motion planner that utilizes a finite set of motion plans and a probabilistic motion planner that utilizes a probabilistic sample of a continuous motion planning space.

Figure 4:
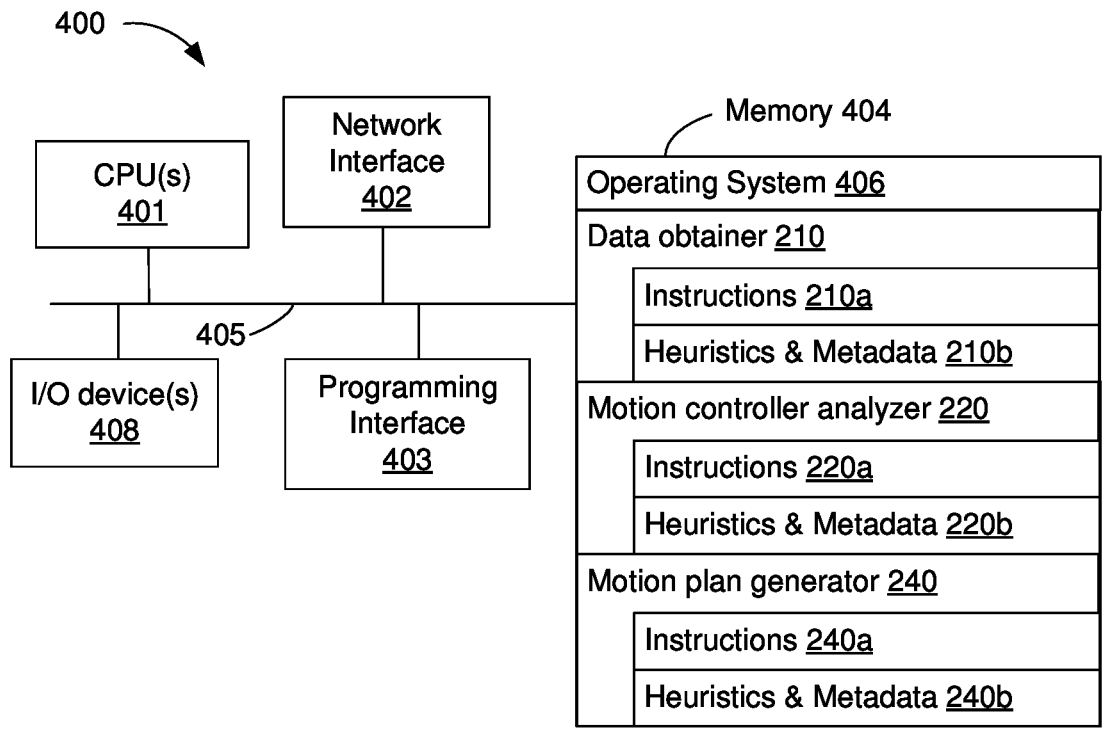
FIG. 4 is a block diagram of a device that provides motions plans to agents in accordance with some implementations.

FIG. 4 is a block diagram of a device 400 in accordance with some implementations. In some implementations, the device 400 implements the motion planner 200 shown in FIGS. 1 and 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 408, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the one or more I/O devices 408 include a receiver for receiving a request (e.g., the requests 56 and 76 shown in FIG. 1, and/or the request 212 shown in FIG. 2). In some implementations, the one or more I/O devices 408 include a transmitter for transmitting a motion plan (e.g., the motion plans 58 and 78 shown in FIG. 1, and/or the motion plan 242 shown in FIG. 2). In some implementations, the receive and the transceiver collectively form a transceiver.

In some implementations, the memory 404 or the non-transitory computer readable storage medium of the memory 404 stores the following programs, modules and data structures, or a subset thereof including an optional operating system 406, the data obtainer 210, the motion controller analyzer 220 and the motion plan generator 240. In various implementations, the data obtainer 210 includes instructions 210*a*, and heuristics and metadata 210*b* for obtaining data (e.g., a request for a motion plan, for example, the requests 56 and 76 shown in FIG. 1 and/or the request 212 shown in FIG. 2). In various implementations, the motion controller analyzer 220 includes instructions 220*a*, and heuristics and metadata 220*b* for determining an input characteristic of a motion controller associated with (e.g., integrated into) an agent that generated the request (e.g., the input characteristic 222 shown in FIG. 2). In various implementations, the motion plan generator 240 includes instructions 240*a*, and heuristics and metadata 240*b* for generating a motion plan for the agent based on the input characteristic of the motion controller associated with the agent. In various implementations, the device 400 performs the method 300 shown in FIG. 3.

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:
at a device including one or more processors and a non-transitory memory:
obtaining, at a motion planner, a request to provide a motion plan for an agent that is associated with a motion controller that controls movement of a representation of the agent in an environment;
determining, by the motion planner, an input characteristic of the motion controller that controls movement of the representation of the agent, wherein the input characteristic characterizes a type of the motion controller;
generating, by the motion planner, the motion plan for the agent based on the input characteristic of the motion controller; and
triggering the motion controller to manipulate the representation of the agent within the environment in accordance with the motion plan generated by the motion planner.

2. The method of claim 1, wherein determining the input characteristic of the motion controller comprises determining a type of input that the motion controller accepts.

3. The method of claim 1, wherein determining the input characteristic of the motion controller comprises determining a number of inputs that the motion controller accepts.

4. The method of claim 1, wherein determining the input characteristic of the motion controller comprises determining a function of an input that the motion controller accepts.

5. The method of claim 1, wherein generating the motion plan comprises:
generating a rapidly-exploring random tree (RRT) that represents the environment;
utilizing the RRT to identify a potential path for the representation of the agent to traverse; and
generating the motion plan in order to allow the representation of the agent to traverse the potential path.

6. The method of claim 1, further comprising utilizing a machine-learned model of a root motion to verify the motion plan.

7. The method of claim 6, further comprising generating a new motion plan for the agent in response to an unsuccessful verification of the motion plan.

8. The method of claim 6, wherein the machine-learned model includes a causal model that represents a subset of a plurality of joints of the representation of the agent.

9. The method of claim 8, wherein the request to generate the motion plan includes the causal model or a reference to the causal model.

10. The method of claim 1, wherein generating the motion plan comprises generating the motion plan based on a target characteristic value specified by the request.

11. The method of claim 1, wherein triggering the motion controller to manipulate the representation of the agent comprises transmitting the motion plan to a second device that implements the motion controller, wherein the motion controller generates torque values for joints of the representation of the agent and moves the joints based on the torque values.

12. The method of claim 1, further comprising:
obtaining, at the motion planner, a second request for a second motion plan for a second agent that is associated with a second motion controller, wherein the second agent is different from the agent and the second motion controller is different from the motion controller;
identifying, by the motion planner, a second input characteristic of the second motion controller, wherein the second input characteristic is different from the input characteristic of the motion controller; and
generating, by the motion planner, the second motion plan based on the second input characteristic of the second motion controller.

13. The method of claim 1, wherein the request includes an identifier (ID) that identifies the agent and/or the motion controller.

14. The method of claim 1, wherein obtaining the request comprises receiving the request via an application programming interface (API).

15. The method of claim 1, wherein the device comprises a server or a cloud computing platform that receives the request from a client device that implements the agent and displays the environment with the representation of the agent.

16. The method of claim 1, further comprising:
determining whether the request is associated with a subscription to a motion planning service;
generating the motion plan in response to determining that the request is associated with a subscription to the motion planning service; and
forgoing generation of the motion plan in response to determining that the request is not associated with a subscription to the motion planning service.

17. The method of claim 1, wherein determining the input characteristic comprises querying a datastore that stores information regarding the agent or the motion controller.

18. The method of claim 1, wherein determining the input characteristic comprises receiving the input characteristic from an entity that created the agent.

19. A device comprising:
one or more processors;
a non-transitory memory; and
one or more programs stored in the non-transitory memory, which, when executed by the one or more processors, cause the device to:
obtain, at a motion planner, a request to provide a motion plan for an agent that is associated with a motion controller that controls movement of a representation of the agent in an environment;
determine, by the motion planner, an input characteristic of the motion controller that controls movement of the representation of the agent, wherein the input characteristic characterizes a type of the motion controller;
generate, by the motion planner, the motion plan for the agent based on the input characteristic of the motion controller; and
trigger the motion controller to manipulate the representation of the agent within the environment in accordance with the motion plan generated by the motion planner.

20. A non-transitory memory storing one or more programs, which, when executed by one or more processors of a device, cause the device to:
obtain, at a motion planner, a request to provide a motion plan for an agent that is associated with a motion controller that controls movement of a representation of the agent in an environment;
determine, by the motion planner, an input characteristic of the motion controller that controls movement of the representation of the agent, wherein the input characteristic characterizes a type of the motion controller;
generate, by the motion planner, the motion plan for the agent based on the input characteristic of the motion controller; and
trigger the motion controller to manipulate the representation of the agent within the environment in accordance with the motion plan generated by the motion planner.

* * * * *